United States Patent [19]

Downing et al.

[11] 4,063,666

[45] Dec. 20, 1977

[54] VOLUME METERING DEVICE HAVING A FLOAT OPERATED VALVE

[75] Inventors: Neil Hugh Downing, Courtlandt Manor Rd., Katonah, N.Y. 10536; Edward Morris Brown, Livingston; Edward Johnson Towns, Convent Station, both of N.J.

[73] Assignee: Neil Hugh Downing, Katonah, N.Y.

[21] Appl. No.: 699,689

[22] Filed: June 25, 1976

[51] Int. Cl.² ............................................. G01F 11/26
[52] U.S. Cl. ..................................... 222/455; 222/457
[58] Field of Search ............. 222/1, 380, 442, 454–457

[56] References Cited

U.S. PATENT DOCUMENTS

| 2,343,024 | 2/1944 | Pearl | 222/455 X |
|---|---|---|---|
| 2,428,233 | 9/1947 | Livadas | 222/455 |
| 2,734,667 | 2/1956 | Conklin | 222/380 X |
| 3,148,801 | 9/1964 | Radeloff et al. | 222/442 X |
| 3,429,485 | 2/1969 | Harkay | 222/442 |

*Primary Examiner*—Robert B. Reeves
*Assistant Examiner*—Fred A. Silverberg

[57] ABSTRACT

A spout device is connected to a liquid storage container for metering and dispensing a quantity of liquid during each successive inverting of the device and container. The spout device includes a first chamber which is in fluid communication with the stored liquid by way of a volume controlling valve mechanism to receive via gravity a given volume of the liquid determined by the valve mechanism when the container is inverted into a pouring position from an upright initial position. When the container is returned to the upright position the given volume of liquid in the first chamber flows through a connecting dump and vent conduit into a second chamber situated below the first chamber. When the container is once again tipped into the inverted pouring position the liquid in the second chamber pours through a pour spout into a suitable receiver. The dump conduit serves as a liquid volume control by overflowing fluid in excess of the premeasured quantity in the second chamber back into the first chamber during the pouring.

13 Claims, 7 Drawing Figures

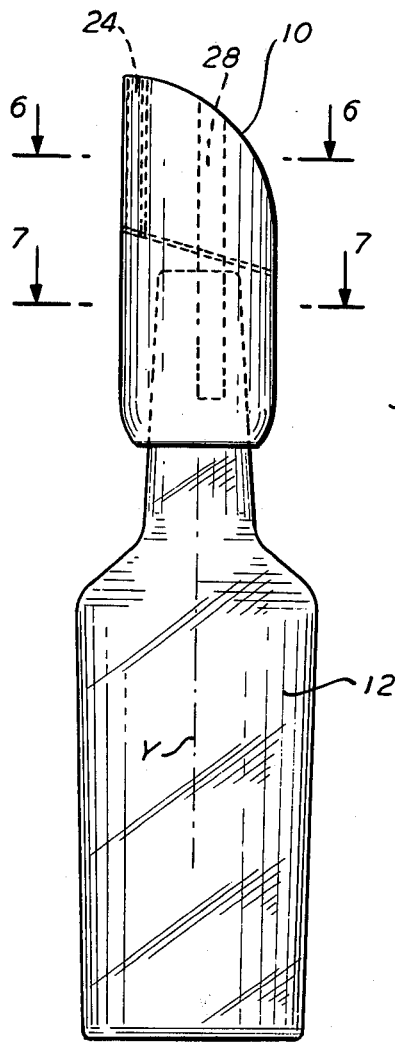
FIG. 1
FIG. 2
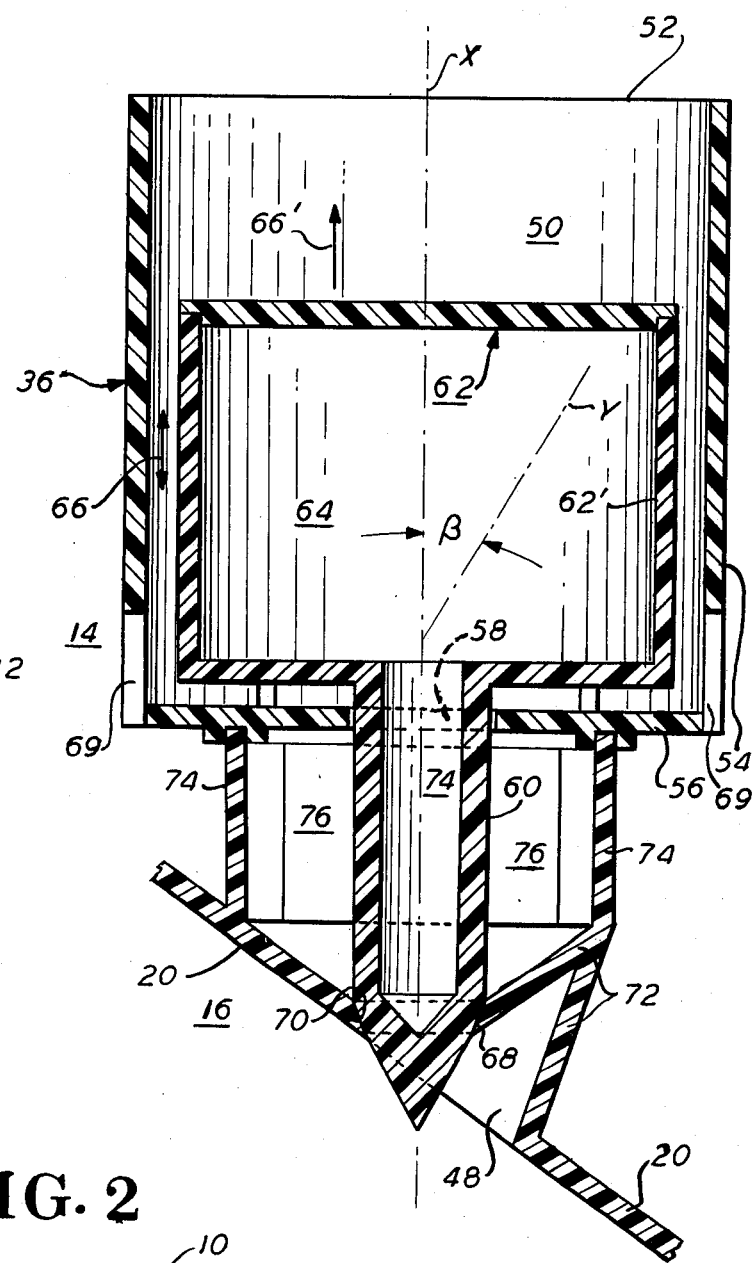
FIG. 4

VOLUME METERING DEVICE HAVING A FLOAT OPERATED VALVE

BACKGROUND OF THE INVENTION

The present invention relates to a device and method for measuring and dispensing a fluid by means of gravity.

DESCRIPTION OF THE PRIOR ART

A well known application for liquid metering devices is in the liquor industry especially in commercial establishments which are required to pour measured quantities of liquor on demand. Such establishments can at times be extremely busy and would find useful metering devices which are rapid, accurate, and convenient to use.

One prior art device meters liquid when the container is inverted into the pouring position. However, this device does not meter the fluid immediately upon inverting of the container. Instead, the metering device must fill first, after being inverted, with the measured quantity of fluid each and every time the fluid is poured. This is a relatively slow acting process and has not met with general acceptance. Other devices are merely attachments to the top opening of the bottle for dispensing the fluid from within. The operator requires a measuring container or uses experience in timing the pouring in determining the amount poured which usually is grossly in error and costly.

SUMMARY OF THE INVENTION

A metering device for measuring and dispensing via gravity a given volume of a flowable non-gaseous medium comprises a first medium storage compartment including means for receiving, measuring and storing a first volume of the medium at least as great in magnitude as the given volume fed by gravity. A second medium storage compartment is adapted to receive by gravity the first volume of the medium and forms a second volume of the medium therefrom. Means are provided for the dispensing of the medium from the second storage compartment by gravity. The first and second compartment and the dispensing means are disposed in a given orientation with respect to each other, so that the dispensing means dispenses the second volume simultaneously with the receiving by the first compartment of the first volume.

A method of metering and dispensing via gravity a volume of a flowable medium having a given volume from a medium supply means comprises receiving the medium from the supply means, measuring the first volume of the medium having a value at least as great in magnitude as the given value, storing the measured first volume in a first chamber, flowing the first volume from the first chamber into a second chamber forming a second volume and storing the second volume in the second chamber, and dispensing the second volume while simultaneously forming and storing the first volume.

BRIEF DESCRIPTION OF THE DRAWING

FIG. 1 is a side elevational view of a metering spout in accordance with an embodiment of the present invention, FIG. 2 is a plan view of the spout of FIG. 1, FIG. 4 is a side sectional view of the valve assembly taken along lines 4—4 of FIG. 6.

DETAILED DESCRIPTION OF THE PREFERRED EMBODIMENT

Figure 3:
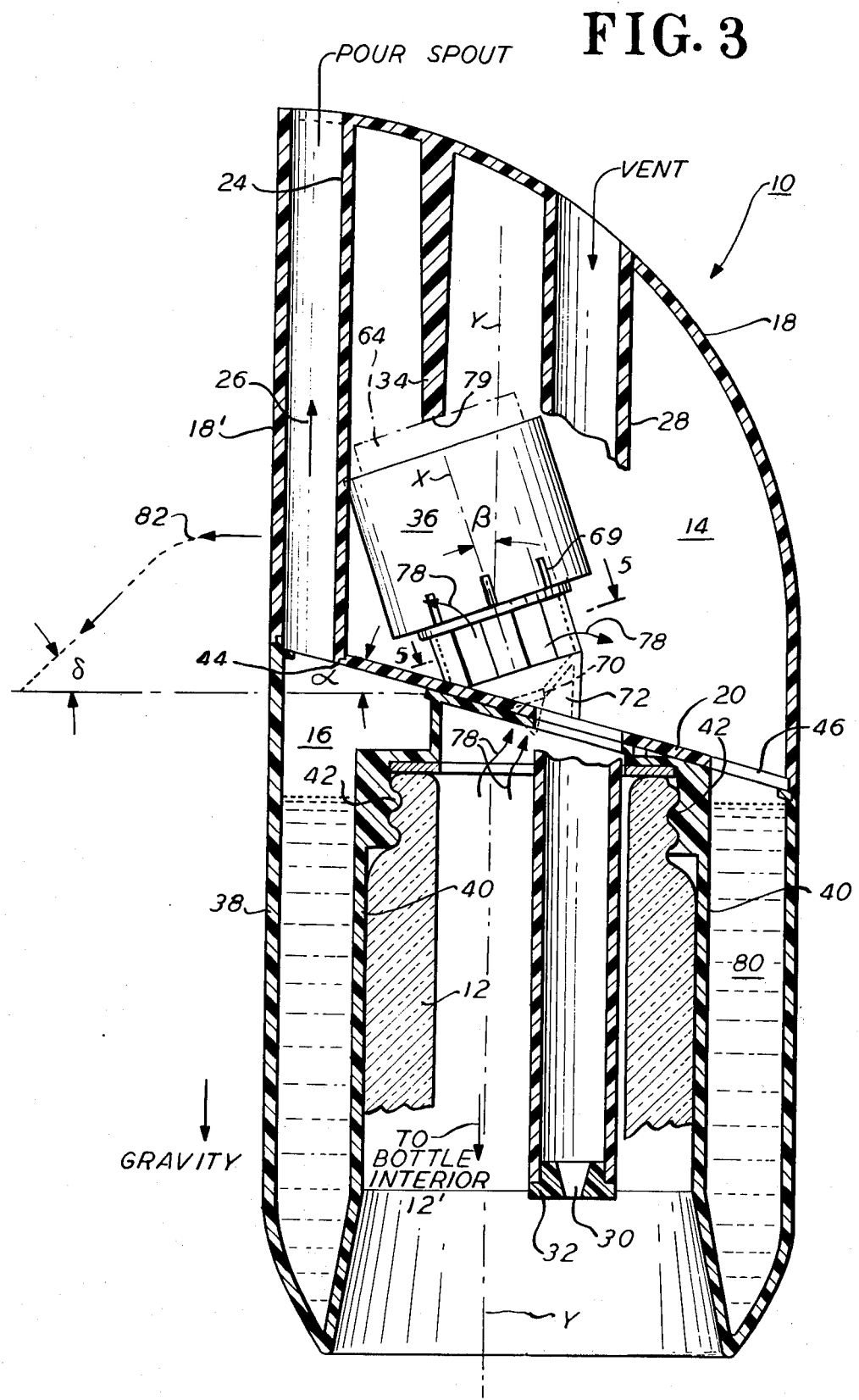
FIG. 3 is a side sectional view of the spout of FIGS. 1 and 2 taken along lines 3—3, FIG. 2.
Figure 5:
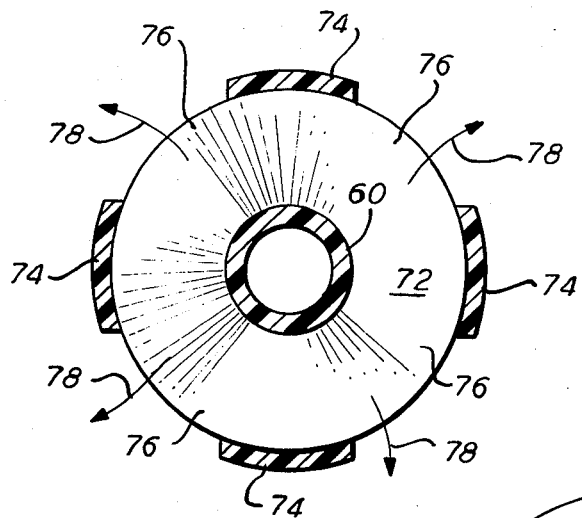
FIG. 5 is a plan sectional view taken along lines 5—5 of FIG. 3.

In FIGS. 1 and 2, cap device 10 is a pouring spout arranged to be screwed to the top of a conventional liquor bottle 12 for pouring a liquid or flowable powder medium from a portable container. In the embodiment described herein the device 10 is of the type used with a liquid. In FIG. 3, device 10 includes an upper chamber 14 and a lower chamber 16. Chamber 14 is approximately cylindrical in plan and has a stylized tapered upper side and top wall 18. The tapered exterior shape of wall 18 is provided for aesthetic purposes. Chamber 14 is defined by wall 18 and lower wall 20 and may be any suitable convenient shape. The volume of chamber 14 is important as will be explained. Chamber 14 bottom wall 20 is joined with upstanding upper wall 18 at the lower edge thereof. Chamber 14 has disposed therein a pour spout 24 which is adjacent to and contiguous with wall 18 at 18' for pouring a liquid in direction 26. Pour spout 24 is in communication with the ambient at the upper end of chamber 14 wall 18. The lower end of spout 24 is open to and in communication with lower chamber 16. Wall 18 and pour spout 24 may be molded as a unitary integral member from a suitable thermoplastic material.

Figure 6:
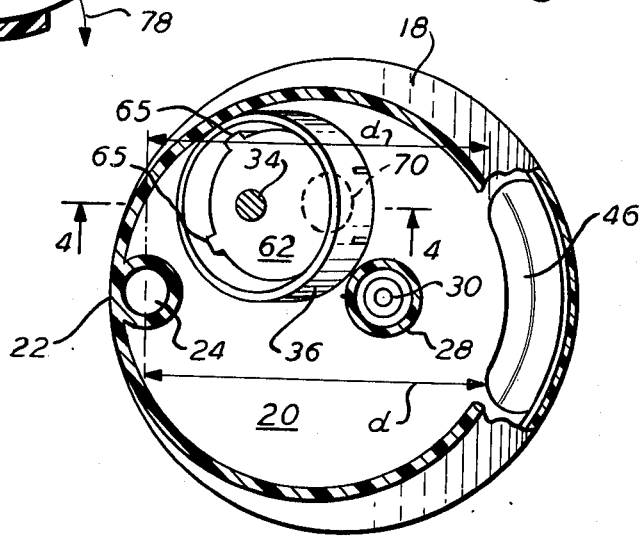
FIG. 6 is a plan sectional and fragmentary view of the apparatus of FIG. 1 taken along lines 6—6.

Centrally disposed in chamber 14, as best seen in FIG. 6, is vent tube 28. Tube 28 is open to the ambient at the upper end extending through wall 18. Tube 28 extends through bottom wall 20 into the bottle 12 interior. Vent tube 28 has a relatively large cross-sectional dimension extending the length thereof with respect to a relatively smaller aperture 30 formed in plug 32, secured to the bottom end of tube 28. The vent tube configuration is well known in the fluid mechanics art.

Secured to the upper part of wall 18 and depending downwardly therefrom is a valve stop 34. The purpose of valve stop 34 will be explained hereinafter. Disposed directly beneath valve stop 34 is valve assembly 36. Valve assembly 36 is secured to bottom wall 20 and extends upwardly from wall 20 into chamber 14. The valve assembly 36 is in communication with bottle 12 interior as will be explained in more detail in connection with FIG. 4.

Figure 7:
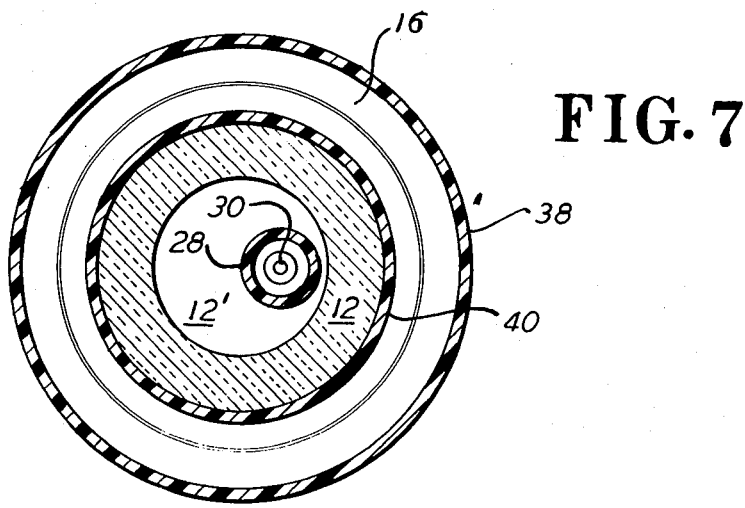
FIG. 7 is a plan sectional view of the apparatus of FIG. 1 taken along lines 7—7.

Depending downwardly from bottom wall 20 is lower chamber 16. The lower chamber 16 is saddle-like in shape and approximately cylindrical in cross-section as best seen in FIG. 7. Chamber 16 is formed by two generally concentric cylindrical walls 38 and 40. Wall 40 is disposed adjacent to the exterior surface of bottle 12 straddling the upper neck thereof. Wall 38 is contiguous with wall 18. Lower chamber 16 is suitably cemented to bottom wall 20 as is upper wall 18. The lower most edges of walls 38 and 40 are integral forming a chamber surrounding bottle 12. Inner wall 40 is cemented to bottom wall 20 forming sealed chamber 16. The upper, inner surface of wall 40 facing bottle 12 is formed into an internal thread 42. All elements of device 10 may be made from molded thermoplastic material.

Bottom wall 20 is sealingly engaged with vent tube 28 around the exterior surface of tube 28 to seal the bottle 12 interior from direct fluid communication with chamber 14 through the interface between tube 28 and wall 20. Wall 20 has a suitable aperture 44 which receives spout 24 so that the fluid pouring from chamber 16 in direction 26, through spout 24, does not enter chamber 14 at the interface therebetween. Aperture 46 is formed in wall 20 diametrically opposite aperture 44. Aperture 46 serves as a dump hole and as a fluid volume control in a manner to be explained. A third aperture 48, as best seen in FIG. 4, is formed in plate 20 for providing fluid communication between the bottle 12 interior and chamber 14 by way of valve assembly 36.

In FIG. 4 valve assembly 36 includes a cylindrical chamber 50 open at upper end 52 in direct communication with chamber 14. Chamber 50 is defined by cylindrical upstanding wall 54 and a bottom plate 56 secured to the lower end of wall 54, opposite end 52. Bottom wall 56 has a centrally disposed aperture 58. Aperture 58 serves to receive the stem 60 of valve and float assembly 62. Stem 60 is a cylindrical member whose upper end is integral with cylindrical float 62' forming a sealed air filled float volume 64. Float 62' is free to move by the forces of gravity and buoyancy forces in a manner to be explained in the direction 66. As best seen in FIG. 4, float 62' has a plurality of bearing ribs 65 which guide float 62' against wall 54. Ribs 65 extend in direction 66 the length of side wall 54 (FIG. 4). Wall 54 serves to guide the valve and float assembly 62 so that the assembly may translate only in direction 66. Secured to and integral with stem 60 is valve 68. Valve 68 is a tapered conical member which seats in a complimentary mating valve seat 70. Seat 70 is formed integral with wall 20 and structure 72. Structure 72 is connected to wall 20. It is to be noted that wall 20 is disposed at an angle α with respect to the horizontal (normal to the pour direction 26) with aperture 44 raised above aperture 46 (FIG. 3) to allow all of the fluid to flow out of chamber 14. Valve 68 translates in direction 66 along the X axis (FIG. 1) at angle β with the Y axis (vertical upstanding position). Valve and float assembly 62 in FIG. 4 is positioned at angle β so that assembly 62 is approximately in a vertical position with respect to gravity during the pouring state. This angle is not critical. Thus the X axis of the float assembly 62 is positioned at that angle which will enable assembly 62 to move approximately parallel with the vertical direction toward and away from the forces of gravity when the device 10 spout 24 is in the pour position, angle δ FIG. 3. Spout 24 is aimed in the direction of arrow 82 during the pour mode.

In FIG. 4, valve seal 70 support structure 72 is provided secured to and integral with bottom wall 20 to provide a tight seal with valve 68 at seat 70. Structure 72 extends from bottom wall 20 and includes four upstanding stanchions 74 forming a plurality of fluid apertures 76 which provide fluid communication between chamber 14 and chamber 16 when valve 68 is in the open valve condition. The lower surface of bottom wall 56 is secured to the upstanding edges of stanchion 74 by suitable cement or other suitable fastening means. As a result, when valve 68 is in the open condition the fluid flows in the direction of arrows 78, FIG. 3.

The outer diameter of stem 60 and inner diameter of aperture 58 are arranged so that stem 60 is closely received but slidably engaged with aperture 58 to form a relatively fluid tight seal. However, stem 60 is not so closely received within aperture 58 as to provide frictional binding forces between the two. That is, aperture 58 and stem 60 are sufficiently close to prevent undesirable forces exerted by fluid flowing from chamber 16 to chamber 14 between the walls of stem 60 and aperture 58 on float volume 64. That is the fluid leaking between stem 60 aperture 58 if not otherwise prevented would exert a counteracting force against the desired buoyancy forces of the assembly 62. When bottle 12 (FIG. 3) is inverted to a pouring position (arrow 82) the float volume 64 is disposed inverted in the orientation shown in FIG. 4. Thus the open end 52 faces downwardly and the valve 68 faces upwardly. At this time, fluid from chamber 16 pours between valve 68 and seat 70 into chamber 14. Float 64 is pulled downwardly toward end 52 against stop 34 at end 78 thereof by gravity. This is shown dotted in FIG. 3.

The volume 64 is made sufficiently large so that the buoyant forces due to the liquid filling up chamber 14 during the pour mode will force the valve and float assembly 62 upwardly toward wall 20 (when in the inverted position — direction of arrow 82) until valve 68 is sealed against seat 70, preventing further flow of fluid from the bottom 12 interior into chamber 14. To provide such a relationship between float volume 64 and the fluid to insure a good seal is well known in the fluid mechanics art. During the pour sequence, air flows through vent tube 28 into the interior of bottle 12. This air displaces the liquid in the bottle which liquid then flows through valve assembly 36 into chamber 14. As chamber 14 fills with fluid, air passes through aperture 46 into chamber 16 displacing the liquid in chamber 16 permitting the liquid in chamber 16 to pour rapidly through spout 24. Necessarily during this process valve 70 is in the open valve condition to permit the uninterrupted flow of liquid and air through the system. Air enters chamber 16 via spout 24 when upright.

The float volume 64 is so positioned and the volume of upper chamber 14 is so determined such that when valve 68 stops the flow of fluid into chamber 14, the volume of fluid in chamber 14 at that time is approximately at least as large or slightly greater than the desired volume to be metered by device 10. The volume of chamber 16 is set at that value such that fluid 80 in chamber 16 does not completely fill chamber 16 and stops short of reaching dump aperture 46 when the bottle 12 is in the upstanding position of FIG. 1.

It should be apparent that alternate valve structures may be substituted for the structure of valve assembly 36. For example, stem 60 of FIG. 4 may be connected to or integral with an elongated rod extending from left to right transversely across the drawing, FIG. 4. Stem 60 may be disposed centrally or offset assymetrically with respect to the rod ends. One end of the rod may serve as a fulcrum suitably pivoted to plate 20 while the other end is secured to a suitable float volume. Guide means may also be provided the rod to ensure valve 68 always engages seat 70. In this case stanchions 74 and walls 54 and 56 are not required thus utilizing a simpler construction than the structure of FIG. 4.

In operation, device 10 is threaded onto a suitable liquor bottle or other container of a liquid or flowing a solid granular medium such as fine sand or other similar materials to be metered. A tight seal is formed between bottle 12 and thread 42 by way of a suitable gasket. The bottle 12 and cap device 10 are inverted in the direction of arrow 82 so that the Y axis is disposed approximately 45° from the position shown in FIG. 3 (angle δ). Angle δ is about 45° with the vertical (parallel to the force of gravity — Y axis, FIG. 3). This is considered by experience to be a normal pour position of a hand held bottle. When the Y axis is in the approximate 45° position and assuming chamber 14 is empty, fluid flows from the bottle 12 interior in the direction of arrows 78 through valve seat 70 between stanchions 74 into chamber 14. When in this position, as explained above, the float volume 64 axis X, is approximately vertical with respect to gravity or slightly tilted. As a result the weight of the valve and float assembly 62 forces the assembly into the open valve condition direction 66' until float 62' abuts stop 34 end 78. The fluid flows through valve seat 70 into chamber 14 between stanchions 74 until a predetermined volume, for example, approximately one fluid ounce, is disposed in chamber 14. At this time the buoyancy of float volume 64 forces valve 68 into seat 70, stopping the flow of fluid into chamber 14.

When bottle 12 is returned to the normal upstanding position, as shown in FIG. 3, the fluid in chamber 14 immediately flows by gravity through dump aperture 46 into lower chamber 16. Dump aperture 46 is made sufficiently large so that the fluid dumps almost instantaneously. Dump aperture 46 transfers air from chamber 16 (received from the ambient via spout 24) to chamber 14 at the same time the liquid in chamber 14 dumps through aperture 46 into chamber 16. Thus aperture 46 serves as an air vent and fluid transfer device simultaneously between chambers 14 and 16.

When the bottle is again inverted in the direction of arrow 82, FIG. 3, to the 45° position with respect to the vertical, the fluid in lower chamber 16 immediately flows in direction 26 through the pour spout into a suitable receiving means. Air does not enter spout 24 at this time. Simultaneous therewith, fluid is flowing from the interior of bottle 12 through the valve seat 70 between stanchions 74 into chamber 14 as described above. Thereafter, each and every time the bottle is inverted in the direction of arrow 82, chamber 16 is emptied and chamber 14 fills. A feature of the invention is the disposition and the position of dump aperture 46, as best seen in FIG. 6. Dump aperture 46 is provided dimension $d$, with respect to the center of pour spout 24. It will be appreciated that as the bottle 12 and pour spout 24 are inverted in the direction of arrow 82, the fluid 80 in chamber 16 will flow against bottom wall 20 while it is pouring through pour spout 24. However, the position of aperture 46 as defined by dimension $d$ determines the actual volume of fluid which will pour out of the pour spout 24. That is, any volume in excess of the desired amount that may accidentially have poured into chamber 16 due to inaccuracy of valve assembly 62, will dump through aperture 46 back into chamber 14 when the spout and bottle are in the approximate 45° position (angle δ). As the dimension $d$ is shortened, the volume of fluid 80 in chamber 16 during pouring is reduced, therefore providing a relatively precise control over the volume of liquid that is actually poured through pour spout 24. By lengthening dimension $d$, the volume of fluid 80 in chamber 16 that is poured through spout 24 is increased. Thus while valve 68 may provide an approximate measure of the desired volume, dump aperture 46 provides a more precise control of that volume. In addition by merely altering dimension $d$ in different bottom walls 20, different devices 10 can be provided having a different premeasured volume without altering the remaining portions of the structure.

It will be appreciated that chamber 14 should fill during the time period in which chamber 15 empties. The reason for this is that the operator will revert bottle 12 to the upright position upon chamber 16 being emptied. This chamber 14 should be filled at or before the time chamber 16 is emptied. As a result it should be further appreciated that the transverse cross-sectional areas of vent tube 28, spout 24, valve 70 and corresponding seat 68 and aperture 46 are relative to each other to permit this action. These relationships can be readily determined by one skilled in the fluid mechanics art. However, by way of example only, the following relationships are provided in the exemplary embodiment. Pour spout 24 (circular cross-section) has a transverse diameter of about 0.25 inches. Vent tube 28 (circular cross-section) has an internal transverse diameter of about 0.20 inches at the inlet at wall 18 and a restricted opening at the outlet aperture 30 of about 0.03 inches. Aperture 30 must be at the lower most end of tube 28 to prevent liquid from bottle 12 interior restricting the flow of air therethrough or flowing directly through tube 28. This restriction will occur if aperture 30 is disposed anywhere intermediate the ends of tube 28. Aperture 30 should be small enough to prevent liquid flowing through tube 28 to the ambient. Seat 68 has a circular cross-section having a transverse diameter of 0.15 inches at the narrowest transverse cross-section. Aperture 46 has a transverse area in the plane of plate 20 of about 0.25 square inches noting that this value can be altered in accordance with a given implementation. Also, it should be appreciated that the values just enumerated all can be altered in accordance with a given implementation to provide the desired action described above.

While the embodiment described herein was described in use with a liquid it will be appreciated by those skilled in the fluid mechanics art that readily flowable, powdery materials and fine granular substances such as fine sand, salt, sugar and the like which have the flow characteristics of liquid will operate equally as well in a device such as described above herein.

During the pouring operation when the bottle and spout are in the 45° position (angle δ) it will be appreciated that as the fluid pours out of the spout ambient air is required to replace the fluid emptying from the sealed bottle 12 interior into chamber 14. This replacement air is provided by vent tube 28. The tube 28 extends sufficiently into the neck of the bottle 12 as known in this art to provide suitable vent action. Thus a single vent tube 28 vents the bottle 12 interior and also chamber 14 which is otherwise sealed from the ambient, and chamber 16 which is sealed from the ambient by reason of the fluid flowing through spout 24.

Thus it will be appreciated that once chamber 16 is filled by an initial dummy pour action when device 10 is first put in use, device 10 dispenses an accurate measured volume of fluid almost instantaneously each and every time the bottle is tilted from a vertical upstanding position to the downward pointing pour position (arrow 82 FIG. 3). Thus a convenient and easy dispensing spout is provided while providing accurate control over the volume of fluid dispensed.

What is claimed is:
1. A liquid metering device for measuring and dispensing via gravity a given volume of liquid from a liquid supply means comprising:
   a first liquid storage compartment having a first volume value greater than the value of said given volume and including means for receiving, measuring and storing a first volume of said liquid having a second value less than said first value and at least as great in magnitude as said given volume and fed by gravity from said liquid supply means when the compartment is inverted, said means for receiving, measuring, and storing including float valve means responsive to the fluid pressure in said first compartment for stopping the flow of fluid into said first compartment when the fluid in said first compartment reaches said given volume, a second liquid storage compartment secured to and below said first compartment when upright for receiving by gravity said first volume and storing said first volume as a second volume of liquid having a value substantially the same as said given value, and means for dispensing the second volume of liquid from said second storage compartment by gravity when the compartments are inverted, said first and second compartments and said dispensing means being disposed in a given orientation with respect to each other so that said dispensing means dispenses said second volume simultaneously with the receiving by said first compartment of said first volume.

2. The device of claim 1 wherein said first compartment is substantially sealed from ambient air and further includes a fluid conduit connected between said first and second compartments for flowing by gravity the liquid from said first compartment to said second compartment and for providing a displacement volume of ambient air for said first volume.

3. The device of claim 2 wherein said conduit is positioned with respect to said dispensing means to flow by gravity liquid in said second volume in excess of said given volume to said first compartment.

4. The device of claim 1 further including means for flowing by gravity liquid in said second volume in excess of said given volume to said first compartment.

5. The device of claim 1 wherein said valve means includes a float portion, a valve portion connected to said float portion, a valve seat for receiving said valve portion connected to said first compartment, and inlet means coupled to said seat for flowing said liquid from said seat to said first compartment when said valve is in the open condition, said float portion having a given buoyancy with respect to said liquid for closing said valve when the volume of liquid in said second compartment reaches at least said given volume.

6. A liquid metering device for providing a measured volume of liquid comprising means for receiving liquid, a first liquid storage chamber in fluid communication with said receiving means and arranged to receive liquid from said receiving means when disposed in a first inverted orientation, said first chamber having a volume greater than said measured volume, float valve means associated with said first chamber for providing a predetermined volume of liquid in said first chamber at least as great as said measured volume but less than said first chamber volume, a second liquid storage chamber in fluid communication with said first chamber and disposed with respect to said first chamber so that liquid flows from said chamber to said second chamber when said chambers are in a second upright orientation, liquid volume control means coupled to said second chamber for providing said measured volume in said second chamber when said chambers are disposed in said first inverted orientation, and dispensing means coupled to said second chamber for removing the liquid in said second chamber when said chambers are in said first orientation.

7. The device of claim 6 wherein said volume control means comprises an aperture disposed in a predetermined position with respect to said dispensing means for spilling liquid from said second chamber in excess of said measured volume.

8. The device of claim 6 further including liquid supply means coupled to said receiving means for supplying said liquid to said receiving means only when disposed in said first orientation.

9. The device of claim 8 wherein said supply means includes a container, said container being disposed beneath said device with respect to gravity in said second orientation and above said device in said first orientation for flowing by gravity liquid from said container to said first chamber in said first orientation and for flowing by gravity liquid from said first chamber to said second chamber in said second orientation.

10. A dispensing and measuring cap for a fluid stored in a container comprising:

means for securing the cap to the container in fluid communication with the container interior, means associated with the cap for venting the container interior, a first storage chamber having a given volume and valve means disposed in said cap in fluid communication with said interior for providing a first measured volume of fluid in said first chamber less than said given volume when said cap is beneath the container for gravity feeding the fluid to said first storage chamber, a second storage chamber disposed beneath the first chamber with respect to gravity, a dump hole disposed between said chambers for dumping said measured volume of fluid from said first chamber into said second chamber when said container is beneath said cap and for venting air between said first chamber and said second chamber, and a fluid dispensing conduit coupled to said second chamber for dispensing said fluid from said second chamber when said container is disposed above said cap with respect to gravity.

11. The cap of claim 10 wherein said dump hole is positioned with respect to said conduit to dump liquid from said second chamber to said first chamber when the volume of liquid dumped into said second chamber is greater than a predetermined volume.

12. A measuring and dispensing device for dispensing a volume of fluid having a predetermined value from a container comprising:

a housing including first and second storage chambers one above the other and means for securing the container to the housing, a first fluid passage connecting the first chamber to the interior of said container, vent means for venting ambient air to the container interior, float valve means in said first chamber arranged to close said passage via gravity when the housing is upright and open said passage via gravity when the housing is inverted, fluid from said container tending to flow through said first passage into said first chamber when inverted, said float valve means being so dimensioned and oriented so as to close said first passage in response to the bouyant forces of said fluid when the fluid in said first chamber reaches a volume having said predetermined value, a second fluid passage located on one side of said housing connecting said first and second chambers to transfer fluid in said first chamber to said second chamber when the housing is upright, said second passage being so dimensioned and located to return fluid from said second chamber in excess of said predetermined value to said first chamber when the housing is inverted, and fluid discharge means located on the other side of said housing opposite said one side for discharging the fluid from said second chamber when the housing is inverted.

13. The device of claim 12 wherein said housing includes a dividing wall separating said first and second chambers, said dividing wall sloping downward from said first chamber at said other side towards said second chamber at said one side to provide a volume in said second chamber between said first passage and said other side greater than the volume in said second chamber between said first passage and said one side.

* * * * *